March 5, 1974 — E. SOTO — 3,795,565
MACHINE FOR SIZING AND PROCESSING DRAPERY MATERIAL
Filed June 21, 1971 — 4 Sheets-Sheet 1
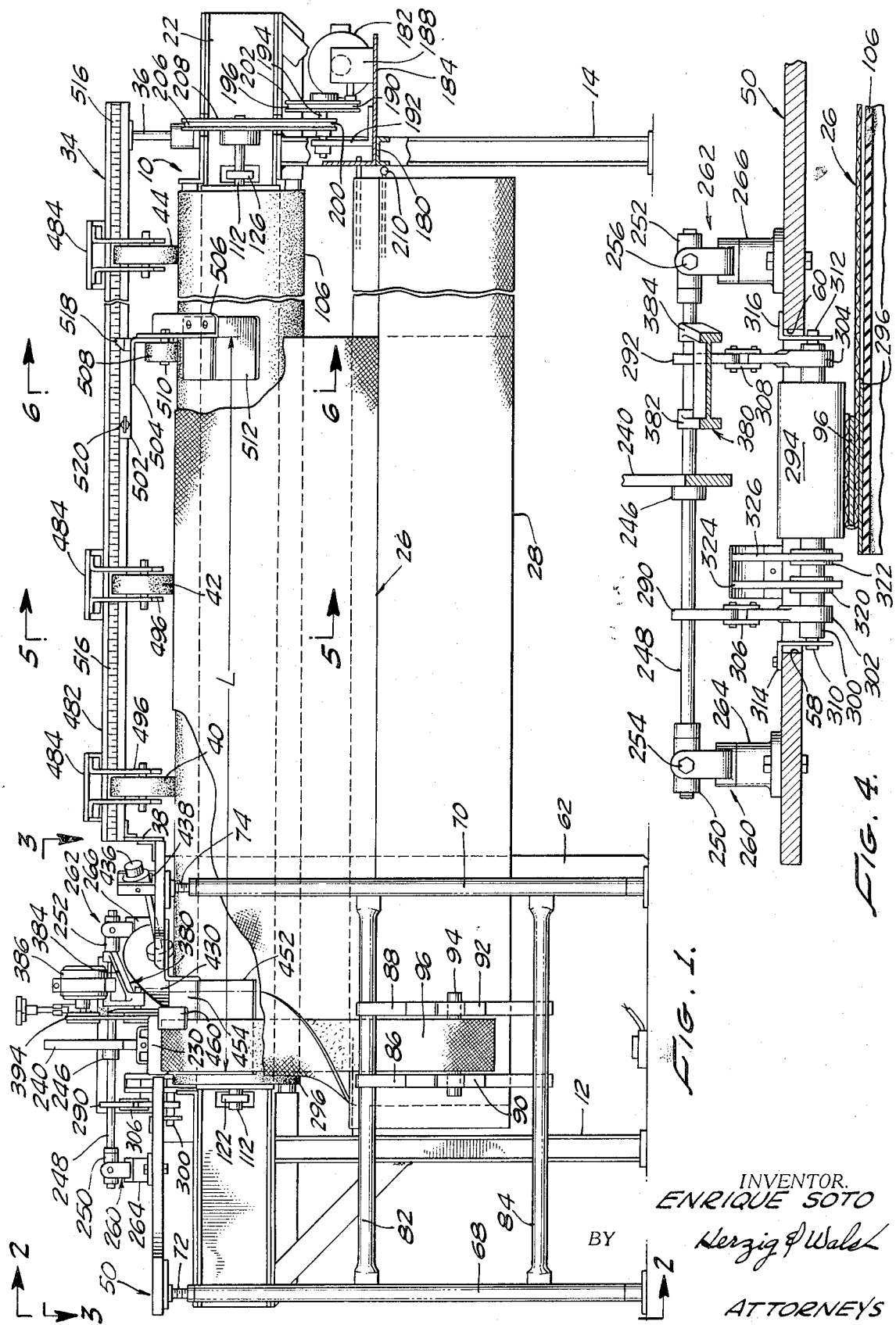
INVENTOR.
ENRIQUE SOTO
BY Herzig & Walsh
ATTORNEYS

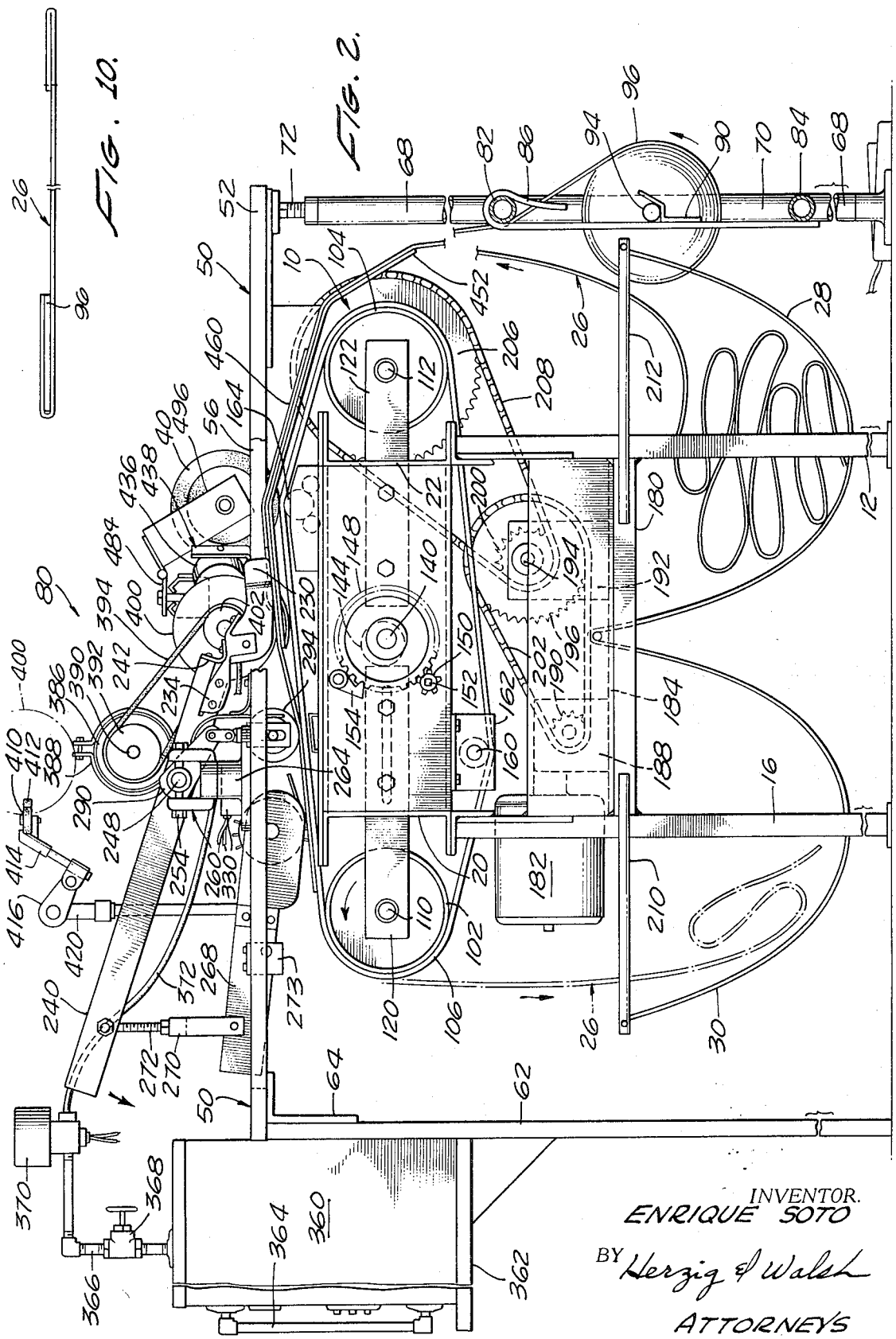

March 5, 1974  E. SOTO  3,795,565

MACHINE FOR SIZING AND PROCESSING DRAPERY MATERIAL

Filed June 21, 1971  4 Sheets-Sheet 3

INVENTOR.
ENRIQUE SOTO

BY Herzig & Walsh

ATTORNEYS

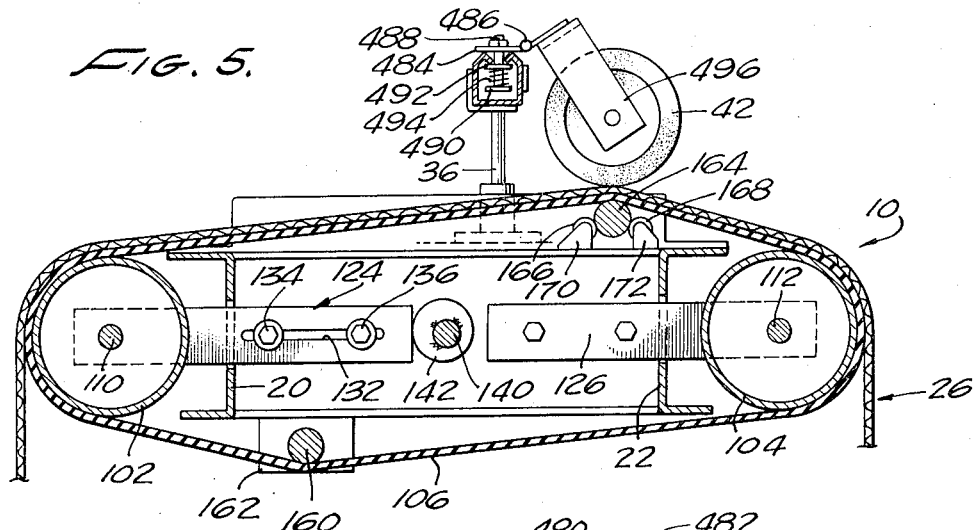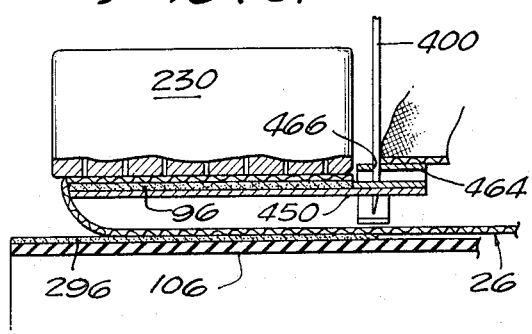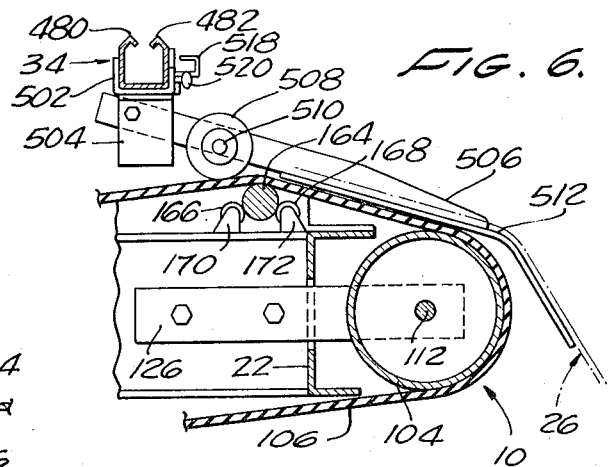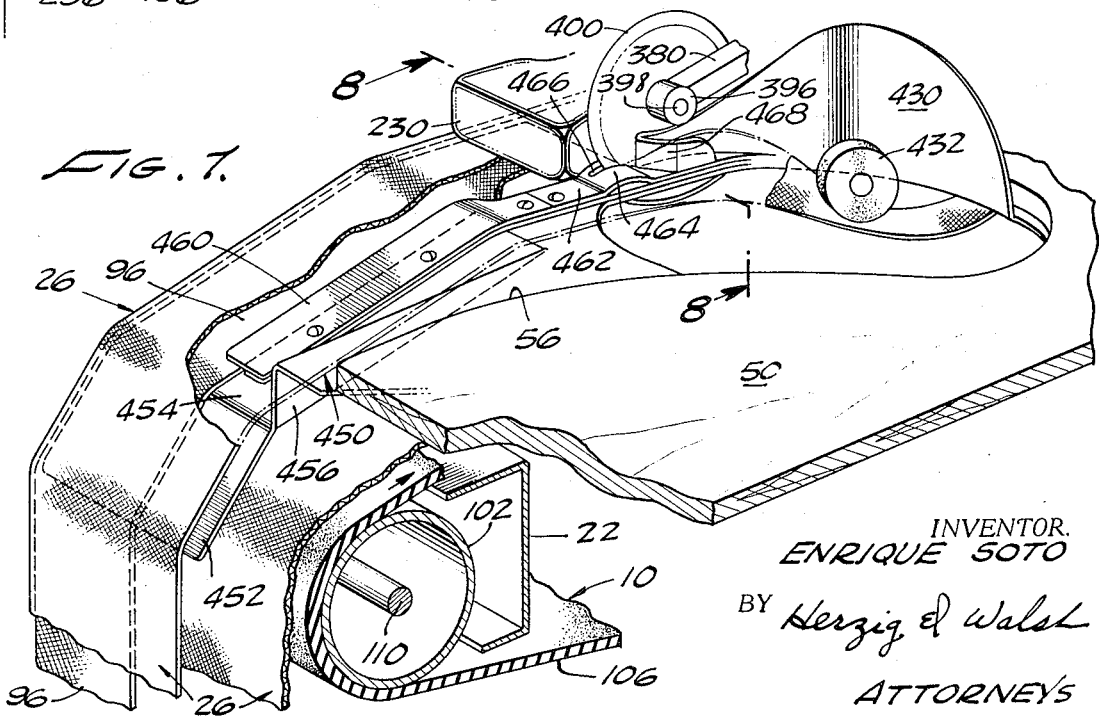

United States Patent Office 3,795,565
Patented Mar. 5, 1974

3,795,565
MACHINE FOR SIZING AND PROCESSING DRAPERY MATERIAL
Enrique Soto, 1638 W. Washington Blvd., Los Angeles, Calif. 90015
Continuation-in-part of abandoned application Ser. No. 841,246, July 14, 1969. This application June 21, 1971, Ser. No. 155,022
Int. Cl. B29d 31/00
U.S. Cl. 156—465                     7 Claims

ABSTRACT OF THE DISCLOSURE

An endless belt of substantial width carries a measured length of drapery material through the machine and through a processing appliance at one end of the machine. Fabric is tumbled from a holder, at the entrance side of the machine through it into a holder at the exit side of the machine. The material passing through the machine comprises several widths seamed together. An accurately measured total width is held by pressure rollers over the endless belt, the measured width being the accurately measured length of a drape being formed. At the end of the machine, the edge of the material which will be the top edge of the drape passes under and then is folded over a plate in an accurate amount, the excess material being continuously cut off by a cutter. A strip of stiffening buckram leads from a roll underneath the plate into a position between the folded over edge. The stiffening material is impregnated with adhesive. A steamer head is provided which is lowered to apply heat to the adhesive to bond folded edges and stiffening material together.

This application is a continuation-in-part of U.S. patent application Ser. No. 841,246, filed on July 14, 1969, now abandoned.

SUMMARY OF THE INVENTION

The invention is a machine for processing fabric material, particularly drapery material from which drapes are made. The machine is one that performs the process known in the trade as tabling as referred to hereinafter by tumbling the material over an endless belt. Tabling of material involves the step of accurately sizing the fabric for the length which the finished drape is to have. Basically, the machine provides a relatively wide endless belt over which the material is passed and on which it is held down by pressure rollers. The machine is provided at one end part of the endless belt with mechanism for processing the edge of a drapery material which is the edge which becomes the top of the finished drape.

BACKGROUND OF THE INVENTION

The machine is one that makes possible processing of drapery material with a greatly reduced amount of hand labor and space requirements which have been characteristic of the prior art up to date. The invention will be best understood from some elucidation of processing of drapery material as conventionally and currently done in the prior art.

Drapes must of course be fabricated to be accurately of the correct length so as to not drag on the floor and are then processed to receive a drapery rod or fixture at the top and are pleated. The drapery material originally comes in fixed widths from bolts of materials. Several widths are sewed together to produce material of the correct width for drapes. As presently done, the drapery material is handled, that is, tabled on relatively large tables which require a great amount of space in processing areas.

Typically, such areas are provided with manually operated clamps at the end of the table for clamping a limited width of material, that is, a width corresponding one of the original widths. The operator at the foot of the table measures the drapery for the correct length and then folds an edge portion inwardly and creases the fold with an iron. The strip of stiffening material such as buckram is then manually inserted between the folded portions and then the laminations are manually bonded by means of an iron. The operator operates on only one of the individual widths at a time and after finishing one width, the material is shifted and another width clamped and the processing repeated. As can be observed, the equipment requires a very large amount of space in the processing area; the work is slow and tedious and can only be done at a slow rate manually by the personnel; and the equipment unweildy and cumbersome.

The herein invention as referred to briefly in the foregoing and described in detail hereinafter as to a preferred exemplary embodiment possesses characteristics such that all of the ennumerated deficiencies are overcome and as well as a number of additional advantages are achieved. A primary object of the invention is to overcome the aforesaid deficiencies and to realize the additional advantages.

A specific object of the invention is to eliminate the need for the large space-consuming tabling surface areas required in the prior art.

Another object is to realize the foregoing object by way of utilizing an endless belt over which the material is tumbled, rather than utilizing a large table surface area.

Another object is to make possible the simultaneous and continuous processing of multiple widths of drapery forming a complete drape of accurately measured length.

Another object is to simplify and make more accurate the sizing of the drape by means provided as a part of the machine.

Another object is to simplify and make possible the continuous processing of the top of the drape, including the folding over of the top edge; applying of the stiffening material; and bonding together the folded over edges and stiffening material.

Another object is to speed up the processing of the drapery material while at the same time reducing the number of personnel required and the amount of space required.

BRIEF DESCRIPTION OF THE DRAWINGS

Further objects and additional advantages of the invention will be become apparent from the following detailed description and annexed drawings:

FIG. 1 is a front elevational view of the machine of the invention;

FIG. 2 is a view taken along the line 2—2 of FIG. 1;

FIG. 4 is a sectional view taken along the line 4—4 of FIG. 3;

FIG. 5 is a sectional view taken along the line 5—5 of FIG. 1;

FIG. 6 is a partial sectional view taken along the line 6—6 of FIG. 1;

FIG. 7 is a partial perspective view of the apparatus for applying the edge stiffener;

FIG. 8 is a partial detail sectional view taken along the line 8—8 of FIG. 7;

FIG. 10 is a detail view of drapery material with the edge stiffener applied.

DESCRIPTION OF THE PREFERRED EMBODIMENT

Figure 3:
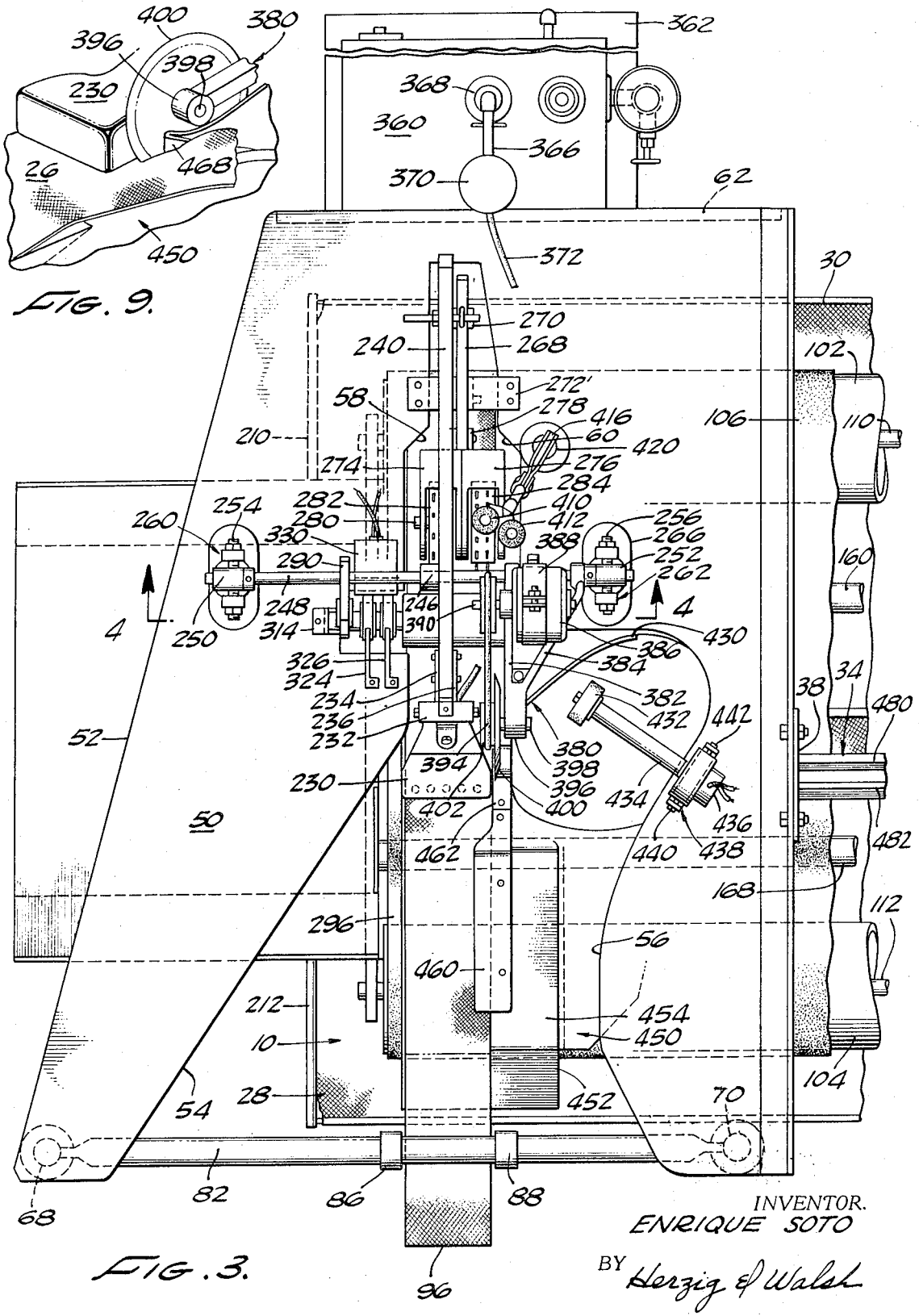
FIG. 3 is a plan view taken along the line 3—3 of FIG. 1.

To facilitate an understanding of the invention, the machine will be described under general headings as follows:

(1) General organization of the machine—FIGS. 1, 2, and 3.
(2) Endless belt assembly and drive therefor—FIGS. 2, 5, and 6.
(3) Stiffener applying apparatus and support platform—FIGS. 1, 2, 3, and 7.
(4) Drapery guiding and sizing apparatus—FIGS. 1, 5 and 6.

General organization of the machine

The general organization of the machine will best be appreciated from FIG. 1 which is a view of the front side of the machine. The operator occupies a position in front of the machine and, more particularly, in front of the apparatus for applying the edge or border stiffener which would be at a position at the bottom of FIG. 3. In operation as will be explained presently, the drapery fabric is tumbled from one basket or fabric holder over a relatively wide endless belt into another basket or holder on the other side of the tabling surface provided by the endless belt. The endless belt assembly is designated as a whole by the numeral 10 in the drawings. The machine of course has a frame which supports the endless belt assembly as well as all other parts of the machine. The machine has four uprights or columns as designated at 12 and 14 in FIG. 1 and also at 16 in FIG. 2. These columns support a pair of spaced transverse flanged beams as may be seen at 20 and 22 in the figures, the beam 20 being seen in FIG. 1. The drapery fabric is designated at 26 in FIG. 2. Numeral 28 designates a first basket or holder made of flexible material. The drapery fabric is tumbled from this holder over the flexible belt assembly and then into a similar basket or holder 30 on the opposite side of the machine.

As may be seen in FIG. 1, above the endless belt assembly, there is provided a guide channel member 34 which is parallel to the endless belt. It is supported at one end by a support member 36 from the frame of the machine, and it is supported at the other end by a support member 38. This member is of U-shaped cross section as may be seen in FIGS. 5 and 6. It adjustably carries a plurality of hold down rollers 40, 42, and 44 which will be referred to more in detail presently in connection with the detailed description of this part of the mechanism.

At the left end of the machine supported at a level above that of the endless belt assembly 10, there is a platform as designated generally at 50. This platform is shown in plan in FIG. 3; and as may be observed, its left edge 52 slants inwardly. It has an intermediate cutout or cut away portion bounded by edges as may be seen at 54, 56, 58, and 60 for purposes which will be described presently. Platform 50 is supported at rear of the machine by an upright or uprights as shown at 62. Numeral 64 designates an angle bracket between the platform 50 and the upright 62. At the front part of the machine, the platform 50 is supported by tubular uprights 68 and 70 having flat bases as shown and having threaded stems 72 and 74 at their upper ends so that the platform 50 can be accurately levelled. Platform 50 supports the apparatus for applying the border stiffening material to the drapery, and this apparatus is designated generally by the numeral 80. Extending between the uprights 68 and 70 are transverse tubular support members 82 and 84; and extending between these members are further brace members 86 and 88 which have brackets as shown at 90 and 92 which support the shaft or arbor 94 for a roll 96 of buckram or other stiffening material. The buckram comes off the roll and passes up over an edge portion of the drapery material which is being carried through the machine by the endless belt assembly 10 as will be described in detail presently.

Endless belt assembly and drive therefor

The details of the endless belt assembly are shown in FIGS. 2, 5, and 6. Numerals 102 and 104 designate two elongated drums or rollers made of suitable material and over which the endless belt 106 passes. The belt 106 may be made of suitable material which can be a synthetic material such as Teflon or the like. The drums or rollers 102 and 104 have shafts 110 and 112. The ends of the shafts are supported at the ends of adjustable support brackets or support members as designated at 120, 122, 124, and 126. The support members 124 and 126 are alike and each is supported for lateral adjustment to adjust the relative position of shaft 110 for adjusting the tension in the belt 106. Referring to the bracket support 124, it has a longitudinal slot 132 and it is mounted by way of bolts 134 and 136 which can be loosened for outward positioning of the support bracket and the other bracket is similarly adjustable. Numeral 140 designates a longitudinal shaft having on it eccentrics 142 and 144 which are engageable with the inner ends of the support members 120 and 124 so that by rotating the shaft, the eccentrics can adjust the outward positioning of these members and accordingly, the position of shaft 110. On the shaft 140 as may be seen in FIG. 2, there is a gear 148 meshing with a smaller gear 150 on shaft 152 which can be turned by a hand crank for thus turning the shaft 140 and adjusting the position of shaft 110. Gear 148 can be locked in position by a pawl 154 which is pivotally mounted as shown.

Numeral 160 designates a roller shaft which is suitably supported at its ends by brackets such as the bracket 162 shown in FIG. 2. The belt 106 is in engagement with it for tensioning the belt. Numeral 164 designates a similar roller shaft supported by two smaller rollers 166 and 168 which are on shafts supported at their ends by brackets such as shown at 170 and 172. The belt 106 has an upper reach or length as shown in FIG. 5. It takes a position as shown in that figure adapted to have the drapery fabric tumbled over its upper surface as will be described in detail hereinafter.

The drive of the endless belt may be seen at the right end of FIG. 1 and in greater detail in FIG. 2. Supported between the uprights 12 and 14 is a platform 180 which supports a drive motor 182 by way of support bracket 184. The motor 182 is connected to drive through a gear box 188 which has an output sprocket wheel 190. Numeral 192 designates a support bracket in which is journalled a shaft 194 on which is a sprocket wheel 196 and a smaller sprocket wheel 200. The drive chain 202 passes over the sprocket wheels 190 and 196, therefore driving the shaft 194 and the sprocket wheel 200. On the shaft 112 is a larger sprocket wheel 206, and passing over this sprocket wheel and the sprocket wheel 200 is a sprocket chain 208 so that shaft 112 and its roller or drum 104 are driven by the motor 182.

Numerals 210 and 212 designate a pair of support members extending out from the platform 180 at one end thereof, there being similar support members at the opposite end which support the baskets 28 and 30.

Stiffener applying apparatus and support platform

This apparatus is supported by platform 50 at the left end of the machine and is shown in detail in FIGS. 1, 2, 3, and partially in perspective in FIG. 7.

The stiffening material such as buckram 96 is impregnated with an adhesive. As will be described, an edge part of the drapery material is folded over the stiffening material and bonded thereto by applying heat to the laminations to soften the impregnated adhesive. The heat is applied by way of a steamer head as designated at 230, which is in a position over the endless belt assembly and over the folded edge part of the drapery material with the buckram between the folds as will be described in detail presently. The steamer head has orifices for escape of the steam to the fabric. The steamer head is attached to a bracket as shown in 232 having extending wings as shown at 234 and 236 forming a yoke attached to the end of a supporting arm 240. The bracket 232 is further attached to the end of arm 240 by another bracket 242. The arm 240 has an intermediate journal bearing 246 as may be seen in FIG. 3 which is journalled on a transverse shaft 248. The ends of the shaft are journalled in journal bearings 250 and 252 which are supported by threaded stems 254 and 256 carried by yokes as designated at 260 and 262. These yokes are in turn supported in pedestals 264 and 266 and have a swivel mounting therein (see FIGS. 3 and 4).

Numeral 268 designates another support arm which is below and substantially parallel to the support arm 240. Details of the transverse shaft 248 and its support are shown in FIG. 4. The end part of arm 268 is attached to the end of the arm 240 by an adjustable connecting link 270 including an adjustable threaded stem 272 to adjust the spacing between the ends of these arms. A stop member or bracket 272' extends between the sides of the opening in the platform 50, between edges 58 and 60 and forms a limit stop for downward movement of the arm 268. At the other end of the arm 268 are members 274 and 276 which are in the form of yokes, being forked, and being secured to the arm 268 by way of a yoke or bracket 278 as may be seen in FIG. 3. Extending transversely through the forks of members 274 and 276 is a shaft 280 and rotatably supported on this shaft are the spiked rollers 282 and 284, which as will be described, ride on top of the folded edge of the drapery material to assist in guiding it and causing it to pass through the stiffening apparatus.

On the shaft 248 as may be seen in FIG. 4, are a pair of extending arms 290 and 292. Numeral 294 designates a cylindrical roller having an electric heater in it which can be positioned to ride on the folded edge of the drapery material having the stiffening material 96 folded into it as may be seen in FIG. 4. Provided along the left edge of the belt 106 is a strip of asbestos 296 to insure that the heat applied by the steamer head and the roller 294 will not damage the belt.

The heated roller 294 is on a shaft 300 journalled in support bearings 302 and 304 which are suspended by links as shown at 306 and 308 from the members 290 and 292. The ends of shaft 300 are of smaller diameter as shown at 310 and 312. They are able to move vertically in slots in angle brackets 314 and 316 attached to the edges 58 and 60 of the opening in platform 50 as may be seen in FIG. 4. As will be understood from the foregoing, the arms 240 and 268 can be manually rotated together, the arm 240 moving about the shaft 248 to lift the steamer head 230 upwardly away from the drapery material and the endless belt. The arms 290 and 292 at the same time take the shaft 300 and the heated roller 294 away from the edge of the material. For applying current to the electrical heater and the roller 294, there are a pair of rotary contact members or slip rings 320 and 322 which are engaged by brushes 324 and 326. Current is supplied from the unit 330.

Steam can be supplied to the steamer head from a steam generator 360 supported on a platform 362. The steam generator may be of a conventional type heated electrically having suitable controls and having a sight gauge 364. The outlet pipe from the steam generator is designated at 366 having manual valve 368 in it. An electrically controlled solenoid valve 370 can be manually controlled or otherwise for controlling the steam through flexible line 372 leading to the steamer head.

Numeral 380 designates a Y bracket having legs 382 and 384 journalled on the shaft 248. Mounted on this bracket is a motor 386 by way of mounting and 388. The motor has a shaft 390 having a pulley 392 on it driving a drive belt 394. The end part of the Y bracket 380 forms a journal bearing 396 which is journalled shaft 398. On this shaft is rotary cutter disc 400 and also pulley 402 which is driven by the drive belt 394. The Y bracket 380 with the motor 386 and the cutter disc 400 can be swung around shaft 248 as shown in broken lines in FIG. 10 so that the cutter disc is brought up into a position between two sharpening wheels or rotors 410 and 412 which are on shafts supported by yokes carried by an arm 414, as may be seen in FIG. 2, adjustably carried on the end of an arm or bracket 416 which is supported at the end of an upright support stem 420 upstanding from the platform 50. Thus, the cutter disc can be swung up into position for sharpening whenever necessary while still being driven by the motor 386 through the belt 394 for sharpening it.

The cutter disc 400 cuts off the excess drapery material which is beyond the folded over edge portions as shown in FIG. 4 and as will be described in more detail presently.

Numeral 430 designates a guide shield which is provided adjacent the cutter disc 400 in the opening in the platform 50 to assist in guiding and controlling the excess drapery material which is cut off. To assist in this function, there is provided a roller 432 on the end of shaft 434 driven by a small electric motor 436. The motor 436 is supported in yoke member 438 upstanding from platform 50, the motor body being supported by trunnions 440 and 442 to allow vertical swinging movement of the roller 432 and shaft 434 and to assist in control of the excess material cut off.

Figure 9:
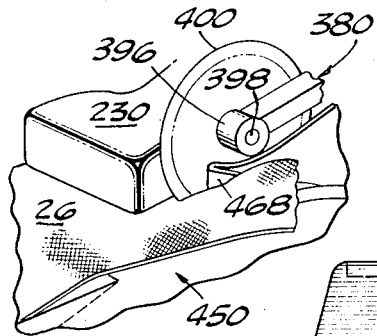
FIG. 9 is a partial detail view of the means for cutting off the excess drapery material.

FIG. 7 is a perspective view of the part of the platform 50 at which the drapery material enters the apparatus for applying the edge stiffening material. As may be seen, the edge part of the drapery material 26 is under the platform 50 and the edge part is then folded up and over the buckram stiffening material 96. Attached to the edge 56 in the opening of the platform 50 is a metal plate member 450 which has a downwardly slanting part 452 forming a ramp and another slanting part 454 adjacent to upright part 456. Supported above the surface part 454 is an upper guide plate 460 which provides an overhang with respect to the plate below it. The strip of buckram is guided beneath the overhang of this plate. The inner end of this plate is narrowed and abuts against another plate 462 supported from plate 450. This plate has an arcuate rise 464 in it; and in this rise, there is a slot 466. The edge of the cutting disc 400 is in this slot. The edge of the folded drapery material passes over plate 460 and the slot 466. The excess cut off part is guided by the guide shield 430 and has leading edge part 468. The details may be observed more clearly in the detail views of FIGS. 8 and 9. The drapery itself is illustrated in cross section in FIG. 10.

Drapery guiding and sizing apparatus

As explained in the foregoing, the machine of the invention having the endless belt assembly provides an alternative to a large table surface for tabling and sizing. In the past, sizing of the drapery has been a very difficult function for the manual operators.

The guide channel 34 as previously described is supported over the endless belt assembly 10. This member is in the form of a generally U-shaped channel having in turned upper edges as shown at 480 and 482. Numeral 484 designates a hinge having a hinge pin 486. One leaf of the hinge is bolted to vertical stem 488 having end flange 490 on it and a washer 492 with a coil spring 494 between them so that the bolt 488 is urged into the channel. Attached to the other leaf of the hinge is a yoke 496 carrying a hold-down roller 42 on it which rides on and holds down the drapery material being carried or tumbled over the endless belt assembly from one basket to the other. The other rollers 40 and 44 are of construction similar to that just described, these rollers being adjustable lengthwise along the channel member 34. An appropriate number of these rollers may be provided.

Referring to FIG. 6, numeral 502 designates an angle bracket which is slidably positioned underneath the channel member 34, and it carries a bracket 504 to which is attached an arm which is an angle iron 506. Numeral 508 designates a smaller roller on a shaft 510 journalled in a part of the angle iron 506. Attached to the angle iron 506 is a guide plate 512 having a shape as in FIG. 6. On the side of the channel member 34 is fixed a graduated scale 516 for measuring, that is, for sizing the drape. The measurement which is made on this scale accurately fixes the length of the drape that is processed by the machine. The edge which the stiffener is applied to is the top edge. Bracket member 502 carries a pointer 518 which can be adjustably set opposite any graduation on the scale 516. The bracket is then fixed in position by way of wing nut 520.

Operation

From an understanding of the usage and operation of the machine, it will be appreciated how it greatly simplifies the tasks of tabling and sizing drapery and greatly reduces the amount of space required for this operation. At the same time, it minimizes the personnel required.

As previously set forth, the drapery material is tumbled from the basket 30 over the endless belt assembly and processed drapery is then tumbled into basket 28 in the back of the machine. The operator stands in front of the machine and at the start, brings the edge of the drapery up over the endless belt to be tabled by tumbling it over the endless belt. One edge of the drapery material which will be the bottom edge of the finished drape is placed against the flange on the angle member 506. This member along with its roller 508 and plate 512 and pointer 518 is adjusted for sizing the drapery for the correct setting on the scale 516 which as pointed out is a measurement of the correct length of the finished drapery. The scale 516 is positioned and graduated so that the pointer 518 will fix an exact measure of drapery length from the top folded over edge which is to be processed by having stiffener material applied. The drapery material passes underneath the hold down and guide rollers 40 and 42. The mounting of these rollers is of course adjustable. They can be lifted about their hinges and then moved longitudinally in the channel member 34.

The left edge part of the drapery material which will be the top of the drapery passes underneath the plate assembly 450 and 454 as may be seen in FIG. 7, and the strip of buckram material 96 is brought up over the ramp 452 and under plate 460, the edge part of the drapery material being folded back to the right over the stiffening material 96 so that its edge is guided over the overhang of the overlying plate 460. In this manner, the drapery material is tumbled through the machine over the endless belt, at all times being held down and guided in exact accordance with the setting of the member 506. The operator merely has to assist in the folding over of the edge of the material, allowing it to be guided into the stiffener applying apparatus. In operation, both the heated roller 294 and the steamer head 230 are resting on the laminations of drapery material and the stiffening material as may be seen in FIGS. 2 and 4, the heat applied serving to cause the impregnated adhesive in the stiffener material to bond the edge laminations together. The excess material is cut off and guided away as already described.

From the foregoing, those skilled in the art will understand the nature and construction of the invention and the manner in which it achieves and realizes all of the objects and advantages as set forth in the foregoing.

The foregoing disclosure is representative of a preferred form of the invention and is to be interpreted in an illustrative rather than a limiting sense, the invention to be accorded the full scope of the claims appended hereto.

What is claimed is:

1. A machine for tabling and measuring fabric material comprising: endless belt means providing a surface over which the material is tumbled from a holder on one side to a holder on the opposite side of the endless belt means; means adjacent one side of the endless belt means for processing an edge part of the fabric material; means overlying the endless belt means and extending transversely over the belt means for guiding and holding the fabric while traversing the endless belt means, said overlying means including means for holding down the fabric and for accurately positioning and guiding the edge part of the material whereby to accurately establish an overall dimension of finished fabric material processed by the machine, said overlying means comprising adjustable means adapted to engage and provide a stop for one edge of the fabric material whereby to cause said one edge to accurately traverse the endless belt means at said position; laterally adjustable rotor means engaging the fabric material; and measuring and indicating means for indicating said position of said adjustable means.

2. A machine for processing fabric material comprising: an endless belt means providing a surface over which the material is tumbled from a holder on one side to a holder on the opposite side of the endless belt means; means for holding down the fabric on the belt means and accurately positioning and guiding one edge of it; and means adjacent to one side of the endless belt means for processing the other edge part of the fabric material, said processing means comprising a mechanism for guiding the other edge part of the fabric material and applying a flat stiffener strip onto said edge part of the material, said mechanism including a plate means closely overlying said other edge part whereby a portion of said edge part can be folded over onto said flat stiffener strip, and further means for guiding the folded over portions and flat stiffer strip and and joining them together.

3. A machine as in claim 2, including a flat strip of stiffening material impregnated with adhesive and apparatus for applying heat to laminations of folded over fabric material and stiffener material for causing the adhesive to bond the laminations to bond together.

4. A machine as in claim 3, including a steamer head for applying heat to the laminations and a heated pressure roller for applying heat and pressure.

5. A machine as in claim 3, including a pivotally mounted beam member carrying said heat applying means adapted for movement to lift the heat applying means away from the fabric.

6. A machine as in claim 2, said guide mechanism having a ramp portion adapted to guide the strip of stiffening material through the machine, said guide mechanism being positioned to allow fabric material to pass underneath it.

7. A machine as in claim 6, including cutting means associated with the adhesive bonding means for cutting off an excess part of the fabric material at the bonded laminations.

References Cited
UNITED STATES PATENTS

| | | | |
|---|---|---|---|
| 3,012,603 | 12/1961 | Newsome et al. | 156—465 X |
| 3,102,305 | 3/1963 | Haneda et al. | 19—157 |
| 3,184,798 | 5/1965 | Burnet et al. | 19—106 R |
| 3,463,482 | 8/1969 | Baron et al. | 112—147 X |
| 3,534,954 | 10/1970 | Lynch | 112—147 X |
| 3,654,015 | 4/1972 | Purcell et al. | 156—465 X |

EDWARD G. WHITBY, Primary Examiner

U.S. Cl. X.R.

156—378, 522, 530